(12) United States Patent
Kriegesmann

(10) Patent No.: US 8,176,092 B2
(45) Date of Patent: May 8, 2012

(54) CONSISTENCY ENFORCEMENT SYSTEM FOR XML OBJECTS STORED IN AN SOA-REGISTRY

(75) Inventor: Peter Kriegesmann, Mannheim (DE)

(73) Assignee: Software AG, Darmstadt (DE)

( * ) Notice: Subject to any disclaimer, the term of this patent is extended or adjusted under 35 U.S.C. 154(b) by 315 days.

(21) Appl. No.: 12/458,735

(22) Filed: Jul. 21, 2009

(65) Prior Publication Data
US 2010/0325165 A1 Dec. 23, 2010

(30) Foreign Application Priority Data
Jun. 19, 2009 (EP) ..................................... 09163301

(51) Int. Cl.
G06F 7/00 (2006.01)
G06F 17/00 (2006.01)

(52) U.S. Cl. ........ 707/802; 707/667; 707/803; 707/955; 707/959

(58) Field of Classification Search ........................ None
See application file for complete search history.

(56) References Cited

U.S. PATENT DOCUMENTS

| | | | |
|---|---|---|---|
| 7,814,470 B2 * | 10/2010 | Mamou et al. ................. | 717/162 |
| 8,060,553 B2 * | 11/2011 | Mamou et al. ................. | 709/203 |
| 2004/0193703 A1 * | 9/2004 | Loewy et al. ................. | 709/220 |
| 2008/0082569 A1 * | 4/2008 | Mansour et al. .............. | 707/102 |
| 2008/0301430 A1 * | 12/2008 | Bradley et al. ................ | 713/150 |
| 2009/0049040 A1 | 2/2009 | Fay et al. | |
| 2009/0326988 A1 * | 12/2009 | Barth et al. ........................ | 705/4 |

OTHER PUBLICATIONS

"On the Modeling of Correct Service Flows with BPEL4WS", Reichert et al., Proceedings of the EMISA Oct. 2004 Conference, Luxembourg, pp. 117-128.
"Effective SOA Deployment Using an SOA Registry Repository", Sun Microsystems Inc., Sep. 2005.
"Quadrant for Business Process Management Suites", Hill et al., 2007 Gartner Research.

* cited by examiner

Primary Examiner — Shyue Jiunn Hwa
(74) Attorney, Agent, or Firm — Nixon & Vanderhye PC

(57) ABSTRACT

A consistency enforcement system includes an XML object of an SOA-registry. The XML object includes a plurality of processing task XML elements that define a processing task to be performed the SOA. An updated XML object is received through an interface. The updated object includes at least one additional processing task XML element that defines at least one further processing task to be performed by the SOA. A validation unit is use to query the SOA-registry in order to obtain one or more predefined processing task identifiers. The validation unit matches a processing task identifier of the at least one additional processing task XML element of the updated XML object against the one or more predefined processing task identifiers obtained from the SOA-registry and approves or rejects the updated XML object (20') depending on the result of the match.

15 Claims, 28 Drawing Sheets

Figure 1:
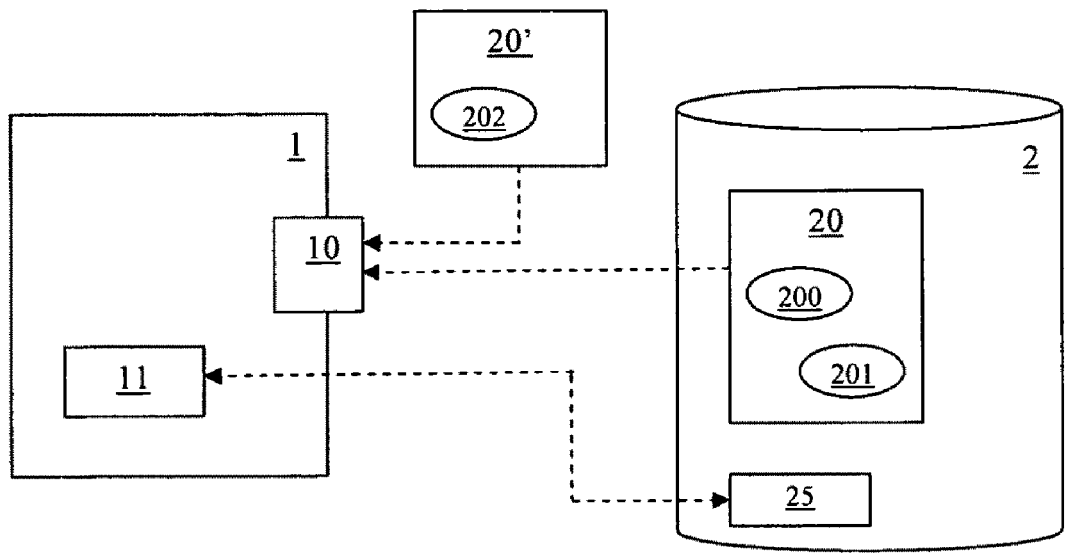

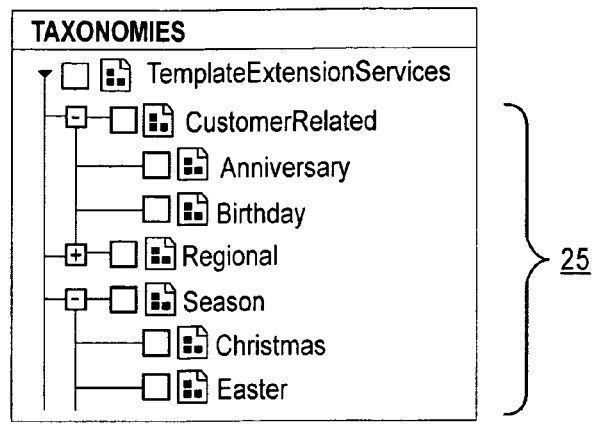
Fig. 5a
Fig. 5b
☐ △ AddFlowerToOrderService   Service
Fig. 5c

Fig. 11

```
if (nd.getType().equals(NodeDifferenceTypes.ELEM)) {
  if (nd instanceof DeletedNodeDifference) {
    Element removedElement = (Element) nd.getRemoteNode();
    // removing invokeSteps is forbidden
    if (removedElment.getLocalName().equals("invokeStep")) {
      bpmdc.reportRemovedService(removedElement);
    }
  }
  if (nd instanceof AddedNodeDifference) {
    Element addedElement = (Element) nd.getThisNode();
    // introducing new terminateSteps is forbidden
    if (addedElement.getLocalName().equals("terminateStep")) {
      bpmdc.reportIllegalTerminateStep(addedElement);
    }
    // record new service invocation steps
    if (addedElement.getLocalName().equals("invokeStep")) {
      bpmdc.reportNewService(addedElement);
    }
  }
}
```

Fig. 12

```
if (nd.getType().equals(NodeDifferenceTypes.ELEM)) {
  if (nd instanceof AddedNodeDifference) {
    Element addedElement = (Element) nd.getThisNode();
    // record added transitions
    if (addedElement.getLocalName().equals("transition")) {
      bpmdc.reportNewTransition(addedElement);
    }
  }
}
if (nd.getType().equals(NodeDifferenceTypes.ATTR)) {
  if (nd instanceof ModifiedNodeDifference) {
    Attr modifiedAttr = (Attr) nd.getRemoteNode();
    boolean targetFound =
      modifiedAttr.getLocalName().equals("target");
    boolean sourceFound =
      modifiedAttr.getLocalName().equals("source");
    boolean transitionFound =
      modifiedAttr.getOwnerElement().getLocalName()
        .equals("transition");
    if (sourceFound) {
      modifiedAttr = (Attr) nd.getThisNode();
      bpmdc.reportRemovedTransition(modifiedAttr
        .getOwnerElement());
    } else if (targetFound && transitionFound) {
      modifiedAttr = (Attr) nd.getThisNode();
      bpmdc.reportModifiedTransitionTarget(
        modifiedAttr.getOwnerElement());
    }
  }
}
}
```

Fig. 13

```
[INFO]: Found modified transition target: S169 (S52 -> S169)
[INFO]: Found new service with id: S169 ("Add Season Gift")
[INFO]: Found new service with id: S229 ("Add Customer Survey Info")
[INFO]: Found new transition: S169 -> S229
[INFO]: Found new transition: S229 -> S56
[INFO]: Checking path: S52 -> S169
[INFO]: Checking path: S169 -> S229
[INFO]: Checking path: S229 -> S56
[INFO]: Found valid target transition path: S229 -> S56

Report:
[INFO]: No BPM Delta Constraints violations found!

Done...............
```

Fig. 14

```
[INFO]: Found modified transition target: S169 (S52 -> S169)
[INFO]: Found new service with id: S169 ("Add Season Gift")
[INFO]: Found new service with id: S229 ("Add Customer Survey Info")
[INFO]: Found new transition: S169 -> S229
[INFO]: Found new transition: S229 -> S56
[INFO]: Found new transition: S169 -> S52
[INFO]: Checking path: S52 -> S169
[INFO]: Checking path: S169 -> S52
[INFO]: Checking path: S169 -> S229
[INFO]: Checking path: S229 -> S56
[INFO]: Found valid target transition path: S229 -> S56

Report:
[VIOLATION]:    Illegal transition found S169 -> S52

Done...............
```

Fig. 16a

| | |
|---|---|
| Construct the comparator | ```
boolean namespaceaware = true;

StreamSource sourceOne = new StreamSource( uri1);
StreamSource sourceTwo = new StreamSource( uri2);

DOMComparer xdt = new DOMComparer( namespaceaware,
sourceOne, sourceTwo);
``` |
| Set the strategy to ordered | `xdt.enableOrderedStrategy();` |
| Enable whitespace awareness | `xdt.setWhitespaceAwareness( true);` |
| Enable prefix awareness | `xdt.setPrefixAwareness( true);`<br><br>Please note that prefixAwareNess without nameSpaceAwareNess is not allowed |
| Constrain the document | ```
String p1 = "/root/a/mysubtree";
String p2 = "/root/a/mysubtree";

String x1 = "//comment()";
String x2 = "//comment()";

xdt.constrainDocument( p1, p2, x1, x2);
```<br>It is possible to constrain the document iteratively, e.g.<br>```
xdt.constrainDocument( "/a/b | /a/c", "/a/b |
/a/c", "//comment() | //@*", "//comment() |
//@*");
```<br>can be also done this way:<br>```
xdt.constrainDocument( "/a/b", "/a/b", "/..",
"/..");

xdt.addSelectionConstraint("/a/c");
xdt.addExclusionConstraint("//comment()");
xdt.addExclusionConstraint("//@*");
```<br>Please note:<br>Exclusion constraints start from the empty node set, whereas selection constraints do start from the node set containing the root node , so if you want to add selection constraints iteratively, you first have to constrain the document like this: |

Fig. 16b

| | |
|---|---|
| | `xdt.constrainDocument( "/..", "/..", "/..", "/..");` |
| Write an xml report | `String stylesheetURI = "....";`<br>`String encoding = "UTF-8";`<br>`OutputStreamWriter outWriter = new OutputStreamWriter( new FileOutputStream( "..."), encoding);`<br>`xdt.compare2XML(( outWriter), css);`<br><br>The completee structure of the xml output can be found in the appendix<br><br>Alternatively you can use NodeDifferenceListener to analye the result of the comparison process:<br><br>1. First you have to create a class implementing the NodeDifferenceListener interface<br><br>`public class MyDifferenceListener`<br>`implements NodeDifferenceListener {`<br>`...`<br>`}`<br><br>2. You have to register your Listener at the comparator object<br><br>`MyDifferenceListener mdl = new MyDifferenceListener();`<br><br>`// register your listener to be informed on all`<br>`differences found`<br><br>`xdt.registerNodeDifferenceListener( mdl );`<br><br>`// you can also listen only to certain differ-`<br>`ences, e.g. node was added, removed, modified.`<br>`// further you can restrict the notification to a`<br>`certain node type.`<br>`// e.g. if you only want to listen to added text-`<br>`nodes, then you will have to register the follow-`<br>`ing way:`<br><br>`xdt.registerAddedNodeDifferenceListener( mdl, NodeDifference.TEXT);` |

| Configuration Details | |
|---|---|
| namespace awareness | true |
| prefix awareness | false |
| whitespace awareness | false |
| compare strategy | ordered |
| display excluded nodes | true |

| <a: elem xmlns : a="http: //A"/> | ← 500 |
| <b: elem xmlns : b="http: //A"/> | ← 501 |

Fig. 17a

| Configuration Details | |
|---|---|
| namespace awareness | false |
| prefix awareness | false |
| whitespace awareness | false |
| compare strategy | ordered |
| display excluded nodes | true |

| <a: elem xmlns : a="http: //A"/> | ← 500 |
| <b: elem xmlns : b="http: //B"/> | ← 501 |

Fig. 17b

| Configuration Details | |
|---|---|
| namespace awareness | true |
| prefix awareness | true |
| whitespace awareness | false |
| compare strategy | ordered |
| display excluded nodes | true |

| ■ <a: elem xmlns : a="http: //A"/> | ← 500 |
| ■ <b: elem xmlns : b="http: //A"/> | ← 501 |

Fig. 18

Fig. 21

| Configuration Details | |
|---|---|
| namespace awareness | false |
| prefix awareness | false |
| whitespace awareness | false |
| compare strategy | unordered |
| display excluded nodes | true |

```
<parent>
   <child>
      Alpha
   </child>
   <child>
      Beta
   </child>
   <child>
      Gamma
   </child>
</parent>
```
← 500

```
<parent>
   <child>
      Gamma
   </child>
   <child>
      Alpha
   </child>
   <child>
      Beta
   </child>
</parent>
```
← 501

Fig. 22

XML DIFFERENCE TRACKER (Copyright Software AG 2001-2004)

| Entry | First XML Document | Second XML Document | Result |
|---|---|---|---|
| id1 | file: TESTA.XML | file: TESTB.XML | ■ |

| First XML Document | file: TESTA.XML |
|---|---|
| analyzed xpath | /*[local-name()='parent'][1] |
| excluded xpath | /.. |
| Second XML Document | file: TESTB.XML |
| analyzed xpath | /*[local-name()='parent'][1] |
| excluded xpath | /.. |

| Configuration Details ||
|---|---|
| namespace awareness | false |
| prefix awareness | false |
| whitespace awareness | false |
| compare strategy | unordered |
| display excluded nodes | true |

```
   <parent>
□    <child attr="x">
■       AlphaX
□    </child>
     <child>
        Beta
     </child>
     <child>
        Gamma
     </child>
   </parent>
```
■ `<parent> newAttributeInDocumentTwo="xx">`

← 500

```
     <child>
        Gamma
     </child>
     <child>
■       Alpha
     </child>
     <child>
        Beta
     </child>
■ </parent>
```

← 501

Fig. 24a

| action | node type | xpath | remoteXpath | name | value | remoteName | remoteValue |
|---|---|---|---|---|---|---|---|
| added | attribute | XPATH of the current node | XPATH of parent node of current node (only provided if strategy is ordered) | name of attribute | value of attribute | - | - |
| added | element | XPATH of the current node | XPATH of parent node of current node (only provided if strategy is ordered) | tag name of element | - | - | - |
| added | text | XPATH of the current node | XPATH of parent node of current node (only provided if strategy is ordered) | - | content of the text node | - | - |
| added | comment | XPATH of the current node | XPATH of parent node of current node (only provided if strategy is ordered) | - | content of the comment | - | - |
| added | processing-instruction() | XPATH of the current node | XPATH of parent node of current node (only provided if strategy is ordered) | target | entire content excluding the target | - | - |
| added | namespace | XPATH of the current node | XPATH of parent node of current node (only provided if strategy is | prefix used for namespace definition | namespace uri | - | - |

Fig. 24b

| | | | ordered) | | | | |
|---|---|---|---|---|---|---|---|
| added | prefix | XPATH of the current node | XPATH of parent node of current node (only provided if strategy is ordered) | prefix | namespace uri assigned to that prefix | - | - |
| modified | attribute | XPATH of the current node | XPATH of the remote node | name of attribute | value of attribute | name of attribute | value of attribute |
| modified | attribute.namespace | XPATH of the current node | XPATH of the remote node | name of attribute | namespace-uri of attribute | name of attribute | namespace-uri of attribute |
| modified | attribute.prefix | XPATH of the current node | XPATH of the remote node | prefix of attribute name | namespace-uri of attribute | prefix of attribute name | namespace-uri of attribute |
| modified | element.namespace | XPATH of the current node | XPATH of the remote node | name of element | namespace-uri of element | name of element | namespace-uri of element |
| modified | element.prefix | XPATH of the current node | XPATH of the remote node | prefix of element name | namespace-uri of element | prefix of element name | namespace-uri of element |
| modified | text | XPATH of the current node | XPATH of the remote node | - | content of the text node | - | content of the text node |
| modified | comment | XPATH of the current node | XPATH of the remote node | - | content of the comment node | - | content of the comment node |
| modified | processing-instruction() | XPATH of the current node | XPATH of the remote node | target | entire content excluding the target | target | entire content excluding the target |
| modified | namespace | XPATH of the owning element or attribute node | XPATH of the owning remote element or attribute node | namespace prefix definition | namespace uri assigned to prefix | namespace prefix definition | namespace uri assigned to prefix |
| modified | prefix | XPATH of the owning element or attribute | XPATH of the owning remote element or attribute node | prefix name | namespace uri assigned to prefix | prefix name | namespace uri assigned to prefix |

Fig. 24c

| | | node | | | | | |
|---|---|---|---|---|---|---|---|
| deleted | attribute | XPATH of parent node of current node (only provided if strategy is ordered) | XPATH of the current node | - | - | name of attribute | value of attribute |
| deleted | element | XPATH of parent node of current node (only provided if strategy is ordered) | XPATH of the current node | - | - | tag name of element | - |
| deleted | text | XPATH of parent node of current node (only provided if strategy is ordered) | XPATH of the current node | - | - | - | content of the text node |
| deleted | comment | XPATH of parent node of current node (only provided if strategy is ordered) | XPATH of the current node | - | - | - | content of the comment |
| deleted | processing-instruction() | XPATH of parent node of current node (only | XPATH of the current node | - | - | target | entire content excluding the target |

Fig. 24d

| | | provided if strategy is ordered) | | | | | |
|---|---|---|---|---|---|---|---|
| deleted | namespace | XPATH of parent node of current node (only provided if strategy is ordered) | XPATH of the current node | - | - | prefix used for namespace definition | namespace uri |
| deleted | prefix | XPATH of parent node of current node (only provided if strategy is ordered) | XPATH of the current node | - | - | prefix | namespace uri assigned to that prefix |

Fig. 25a

```
<!ELEMENT report  ( entry+)>

<!ELEMENT entry ( selectedNodesDocOne,
                  selectedNodesDocTwo,
                  excludedNodesDocOne,
                  excludedNodesDocTwo,
                  namespaceaware,
                  prefixaware,
                  whitespaceaware,
                  strategy,
                  diff*,
                  result)>

<!ATTLIST entry
                  docOneID CDATA #REQUIRED
                  docTwoID CDATA #REQUIRED
                  docOneXPath CDATA #REQUIRED
                  docTwoXPath CDATA #REQUIRED>

<!ELEMENT diff (  xpath?,
                  remoteXpath?,
                  name?,
                  value?,
                  remoteName?,
                  remoteValue?)>

<!ATTLIST diff
                  diffType (   element |
                               attribute |
                               namespace |
                               prefix |
                               element.prefix |
                               element.namespace |
                               attribute.prefix |
                               attribute.namespace |
                               comment |
                               text |
                               processing-instruction)
REQUIRED action ( added | deleted | modified)
REQUIRED>

<!ELEMENT xpath ( #PCDATA)>
<!ELEMENT remoteXpath ( #PCDATA)>
<!ELEMENT name ( #PCDATA)>
<!ELEMENT value ( #PCDATA)>
<!ELEMENT remoteName ( #PCDATA)>
<!ELEMENT remoteValue ( #PCDATA)>
```

Fig. 25b

```
<!ELEMENT selectedNodesDocOne ( #PCDATA)>
<!ELEMENT selectedNodesDocTwo ( #PCDATA)>
<!ELEMENT excludedNodesDocOne ( #PCDATA)>
<!ELEMENT excludedNodesDocTwo ( #PCDATA)>
<!ELEMENT namespaceaware ( #PCDATA)>
<!ELEMENT prefixaware ( #PCDATA)>
<!ELEMENT whitespaceaware ( #PCDATA)>
<!ELEMENT strategy ( #PCDATA)>
<!ELEMENT result ( #PCDATA)>
```

CONSISTENCY ENFORCEMENT SYSTEM FOR XML OBJECTS STORED IN AN SOA-REGISTRY

This application claims priority to European Patent Application No. 09163301.6 filed 19 Jun. 2009, the entire contents of which is hereby incorporated by reference.

TECHNICAL FIELD

The present invention relates to a consistency enforcement system for XML objects stored in an SOA-registry and a corresponding method.

THE PRIOR ART

Complex tasks, such as the manufacturing of complex technical products like automobiles, airplanes, etc., are typically performed with the help of distributed computing environments, i.e. a network of individual computer systems each processing certain functionality such as steering a digitally programmed machine tool as part of the overall manufacturing. Such complex inter-working computing environments may not only be distributed logically (i.e. each computer system processing a certain subtask), but also physically. For example, during the manufacturing of an automobile, some of the computing systems may be located at the car manufacturer to steer the fabrication of the car chassis and engine, while other computing systems may be located at various supplier sites for steering the fabrication of the car seats or the entertainment components of the car. The computing systems may be connected over a network such as the internet in order to coordinate the sequence of processing tasks to be performed.

In order for such complex distributed computing environments to properly function, it is necessary to unambiguously define the overall processing sequence that has to be performed in order to eventually lead to the desired result, e.g. the finished car. At the same time, such a processing sequence has to be kept flexible, so that it can be easily adapted e.g. when a new supplier is selected for some of the components of the car. This is especially important in the context of large computing environments comprising possibly thousands of individual computing systems governed by different parties, where it is on the one hand required that a processing sequence can be adapted by the different individual parties themselves, e.g. that one particular supplier can adapt the processing tasks assigned to him in order to adapt them to his individual assembly line. On the other hand, however, it is absolutely crucial that the processing sequence cannot be adapted in an unallowed manner, i.e. in such a way that it would not provide its overall result anymore. Especially in the context of the manufacturing of complex products such as automobiles, this could lead to a stop of production or in the worst case, to severe damages to the individual computing systems and connected machine tool equipment.

In the field of Service-oriented Architectures (SOA), it is therefore known to maintain definitions of processing tasks as objects within an SOA-registry, which is helpful in order to coordinate and steer the required sequence of processing tasks. However, known SOA-registries do not provide a way of ensuring that a predefined sequence of processing tasks is not adapted in an unallowed manner.

It is therefore the technical problem underlying the present invention to provide a system and method that ensures that the information stored in an SOA-registry can be flexibly adapted, while at the same time guaranteeing that the adaptations are limited to an allowed extent, thereby at least partly overcoming the above explained disadvantages of the prior art.

SUMMARY OF THE INVENTION

This problem is according to one aspect of the invention solved by a consistency enforcement system for at least one XML object stored in an SOA-registry, the at least one XML object comprising a plurality of processing task XML elements each defining at least one processing task to be performed by components of the SOA. In the embodiment of claim 1, the consistency enforcement system comprises:

a. an interface adapted for receiving an updated XML object comprising at least one additional processing task XML element defining at least one further processing task to be performed by components of the SOA that is not comprised in the at least one XML object stored in the SOA-registry;
b. a validation unit adapted for querying the SOA-registry in order to obtain one or more predefined processing task identifiers;
c. wherein the validation unit is further adapted for matching a processing task identifier of the at least one additional processing task XML element of the updated XML object against the one or more predefined processing task identifiers obtained from the SOA-registry and for approving or rejecting the updated XML object depending on the result of the matching.

Accordingly, the embodiment defines a consistency enforcement system that facilitates a flexible adaptation of XML objects in a SOA-registry, e.g. defining a complex manufacturing process, wherein the system at the same time ensures that the XML objects cannot be changed in an unallowed manner. To this end, the SOA-registry stores one or more XML objects each comprising a plurality of processing task XML elements. The processing task elements each define one or more processing tasks to be performed by components of the SOA, such as computers, clients and/or servers, in order to perform the overall processing.

An interface of the consistency enforcement system receives an updated XML object which comprises one or more additional processing tasks for the SOA components defined in one or more corresponding additional processing task XML elements (with respect to the original XML object stored in the SOA-registry). Each processing task XML element preferably comprises a processing task identifier, such as a unique ID and/or a type definition. Furthermore, a validation unit of the consistency enforcement system can query the SOA-registry in order to receive one or more processing task identifiers, preferably in the form of a list of predefined processing task identifiers. The validation unit may then match the processing task identifier of the additional processing task XML element against the list received from the SOA-registry and may determine, whether the updated XML object is approved or rejected. Querying the SOA-registry may comprise submitting an XQuery to the SOA-registry, calling an API (application programming interface) provided by the SOA-registry, or any other suitable querying mechanism, as will be further explained in the detailed description below.

To this end, the validation unit may in one aspect be adapted for rejecting the updated XML object, if the processing task identifier of the at least one additional processing task XML element does not match at least one of the predefined processing task identifiers obtained from the SOA-registry. Accordingly, the list of predefined processing task identifiers may be regarded as a "whitelist". In other words, an additional processing task XML element is only considered valid, if it is explicitly mentioned in the "whitelist" of predefined processing task identifiers (i.e. if the processing task identifier of the additional processing task XML element is comprised in the list). This aspect is especially advantageous, since e.g. a manufacturing supplier wanting to update the XML object is allowed to do so in a flexible manner, while the car manufacturer, which may maintain the "whitelist", keeps control over the extent of adaptations that the supplier can perform.

Furthermore, the XML object and/or the updated XML object and their processing task XML elements, respectively, may comprise references to further objects, such as configuration files. If this is the case, it is preferred that the validation of the matching between the at least one additional processing task XML element and the predefined processing task identifiers obtained from the SOA-registry also takes into account the further referenced objects, e.g. by resolving the references and also validating the content of the referenced objects. An example of this aspect is provided in the detailed description below.

Additionally or alternatively, the validation unit may be adapted for rejecting the updated object, if the processing task identifier of the at least one additional processing task XML element matches at least one of the predefined processing task identifiers obtained from the SOA-registry. Accordingly, in this case, the list of predefined processing task identifiers may be regarded as a "blacklist", i.e. any addition of a processing task XML element is allowed by default, unless it is explicitly mentioned in the "blacklist". It should be appreciated that this aspect achieves a greater flexibility at the cost of slightly less control.

Regardless of the above-presented alternatives, the validation unit may be further adapted for storing the updated XML object in the SOA-registry and/or for replacing the at least one XML object stored in the SOA-registry, only if the updated XML object is approved. Accordingly, rejected updated XML objects are effectively prevented from being stored in the SOA-registry in order to ensure that such an invalid updated XML object cannot interfere with the processing tasks controlled by the SOA-registry. Preferably, the updated XML object, after being approved by the validation unit of the consistency enforcement system, directly overwrites the original XML object within the SOA-registry. This aspect ensures that an updated XML object is "active" immediately, i.e. that the corresponding processing tasks are executed in accordance with the updated XML object immediately.

Additionally or alternatively, also a rejected updated XML object may be stored in the SOA-registry, i.e. even if it comprises invalid extensions, as will be further explained in the detailed description below. In this case, the component or user that is responsible for the update may be notified in order to be able to correct the rejected updated XML object, as will be further explained in the detailed description below.

In a further aspect of the present invention, the validation unit is adapted for rejecting the updated XML object, if the updated XML object comprises at least one termination step XML element defining an end point of a sequence of processing tasks performed by components of the SOA that is not comprised in the at least one XML object stored in the SOA-registry. A termination step XML element defines an end point of a processing sequence defined by an XML object in the SOA-registry, i.e. it determines the final processing task in a series. One example is a termination step XML element named "deliver manufactured car" as the end point of a processing sequence for manufacturing a car. Accordingly, updated XML objects that comprise a new termination step XML element (i.e. a termination step XML element that is not comprised in the corresponding original XML object in the SOA-registry) are not allowed and consequently rejected by the validation unit. Otherwise, a processing sequence (i.e. the corresponding XML object) could be adapted in such a way that it ends before the originally intended result is achieved, which would lead to a malfunction of the overall processing.

Additionally or alternatively, the validation unit may be further adapted for rejecting the updated XML object, if the updated XML object comprises at least one XML element other than a processing task XML element. This aspect imposes even stricter limitations on the adaptability of the XML object, since only and exclusively new processing task XML elements are allowed to be added and any other adaptation is rejected.

In yet another aspect of the present invention, the validation unit is adapted for rejecting the updated XML object, if the XML object stored in the SOA-registry comprises at least one processing task XML element that is not comprised in the at least one updated XML object. In other words, no processing task XML elements defined in the original XML object are allowed to be deleted from the updated XML object. This aspect ensures that no mission-critical processing tasks are deleted from the overall processing sequence, so that it is guaranteed at any time that the processing sequence can be performed from the start to the end as originally intended.

Furthermore, the at least one XML object stored in the SOA-registry may comprise at least one transition XML element, the at least one transition XML element referencing at least one source processing task XML element and at least one target processing task XML element in order to define a sequence between the corresponding processing task XML elements. Accordingly, the intended sequence between the individual processing tasks is explicitly defined in the XML object in the SOA-registry. To this end, the at least one transition XML element references two processing task XML elements, namely a source and a target element. Preferably, the processing task XML elements each comprise an XML attribute defining a unique ID and the transition XML element comprises an XML attribute "source" and an XML attribute "target" whose values are set to the corresponding unique IDs of the respective processing task XML elements.

The validation unit may in a further aspect be adapted for rejecting the updated XML object, if the at least one additional processing task XML element of the at least one updated XML object is not located within the sequence defined by the at least one transition XML element. Accordingly, an adaptation of the XML object is limited to adding an additional processing task XML element between two specific processing task XML elements, namely the source and target processing task XML elements defined by the transition XML element. It should be appreciated that it is also possible to restrict updates to an XML object so that an additional processing task XML element can only be inserted between two specific processing task XML elements located anywhere within the processing sequence, possibly connected by a series of transition XML elements and intermediary processing task XML elements. To this end, the validation unit may be parameterized to define two specific processing task XML elements as "boundaries", i.e. the validation unit may be adapted for ensuring that the updated XML object only comprises an additional processing task XML element between these two parameterized, predefined "boundary" processing task XML elements.

Furthermore, the validation unit may be adapted for rejecting the updated XML object, if the updated XML object comprises at least one additional transition XML element defining a sequence of processing tasks that does not lead to a termination step XML element defined in the XML object stored in the SOA-registry. Accordingly, the validation unit is in this aspect able to avoid the introduction of "dead ends", i.e. the adaptation of the updated XML object in such a way that there is a sequence of processing steps that reaches a processing step that has no subsequent processing step defined. Such a scenario is only allowed for termination steps. An according invalid updated XML object could lead to a situation that the overall processing cannot be finished and/or that the last processing task in the sequence cannot finish its processing since no subsequent processing step is defined. In this case, the last processing step would run until the underlying computing environment crashes or even worse, until the connected further computing systems, machine tools, etc. are severely damaged.

In yet another aspect, the validation unit may be adapted for rejecting the updated XML object, if the updated XML object comprises at least one additional transition XML element defining a sequence of processing tasks that does not lead to the at least one additional processing task XML element. Accordingly, an updated XML object is only approved by the validation unit, if no "back-loops" are defined, i.e. sequences of processing tasks that run in a cycle. Instead, only such additional transition XML elements are allowed which connect to an additional processing task XML element. In other words, an additional transition XML element may not point to (via its "target" XML attribute) one of the processing task XML elements originally defined in the XML object.

The present invention is further directed to a method for enforcing the consistency of at least one XML object stored in an SOA-registry using any of the consistency enforcement systems presented above. Lastly, the present invention provides a computer program comprising instructions for implementing the above method, which may be tangibly stored on a non-transitory computer readable storage medium.

SHORT DESCRIPTION OF THE DRAWINGS

Figure 2:
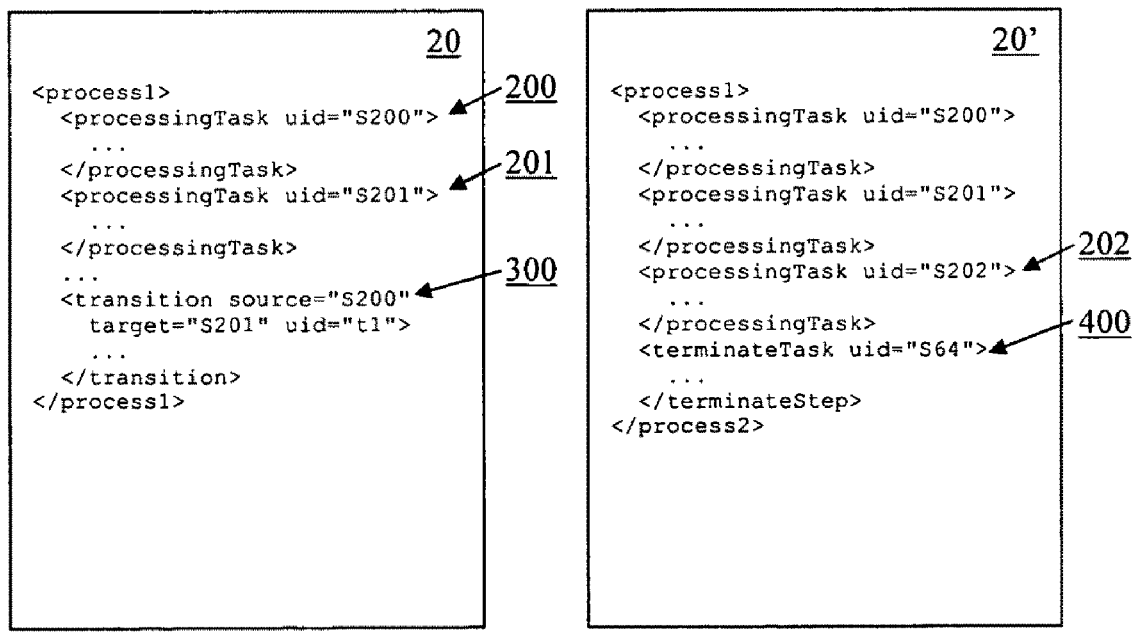
Figure 3:
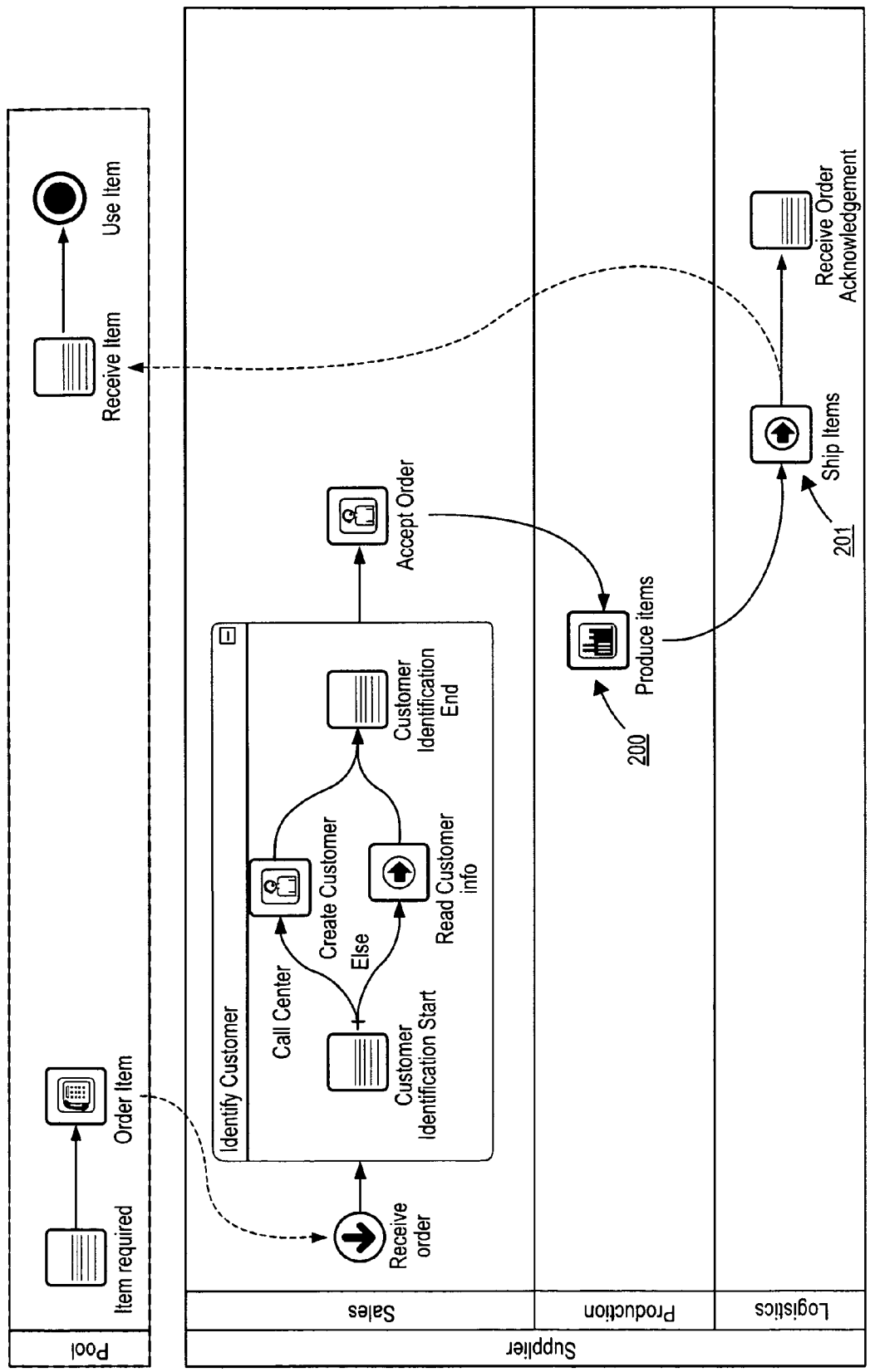
Figure 4:
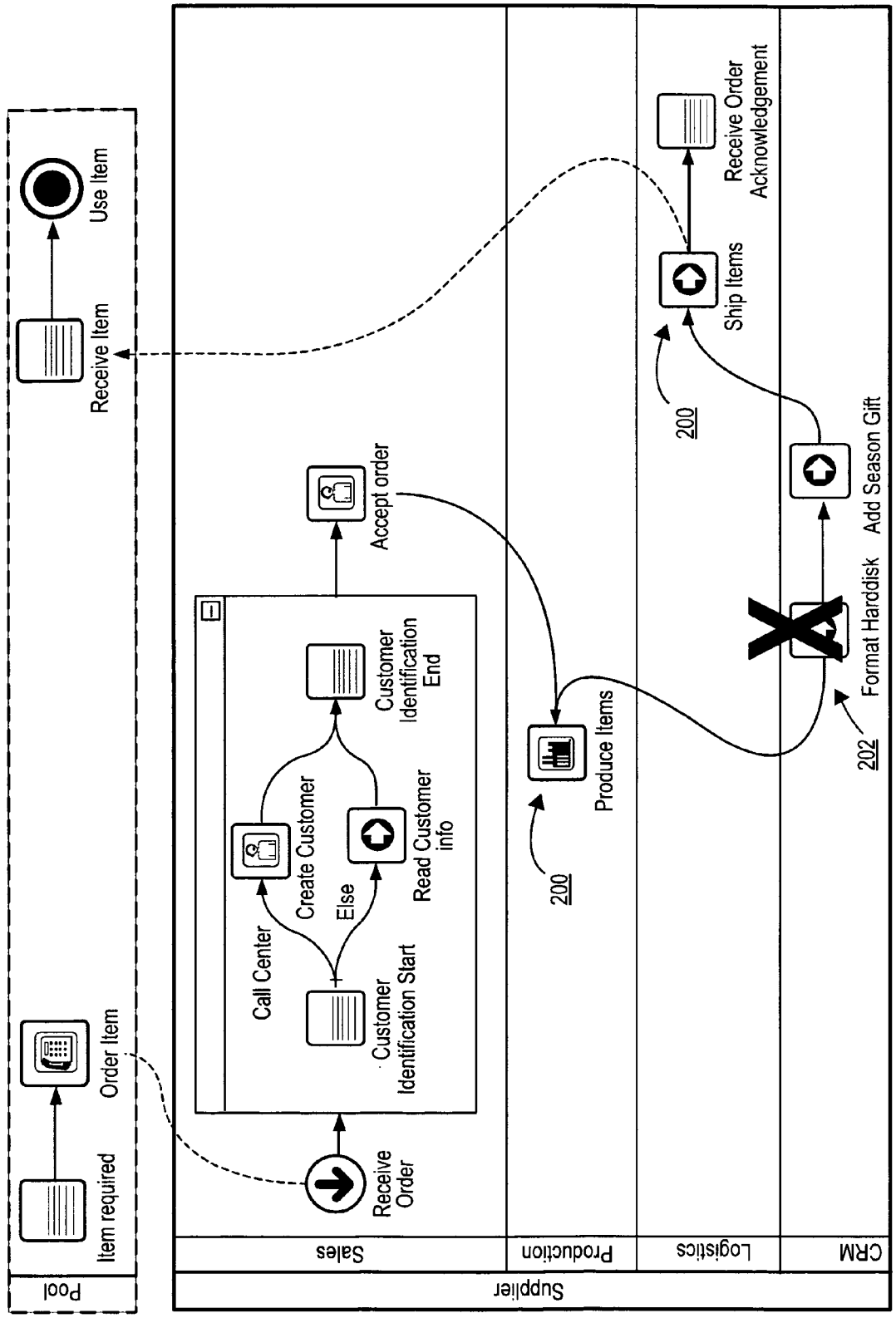
Figure 6:
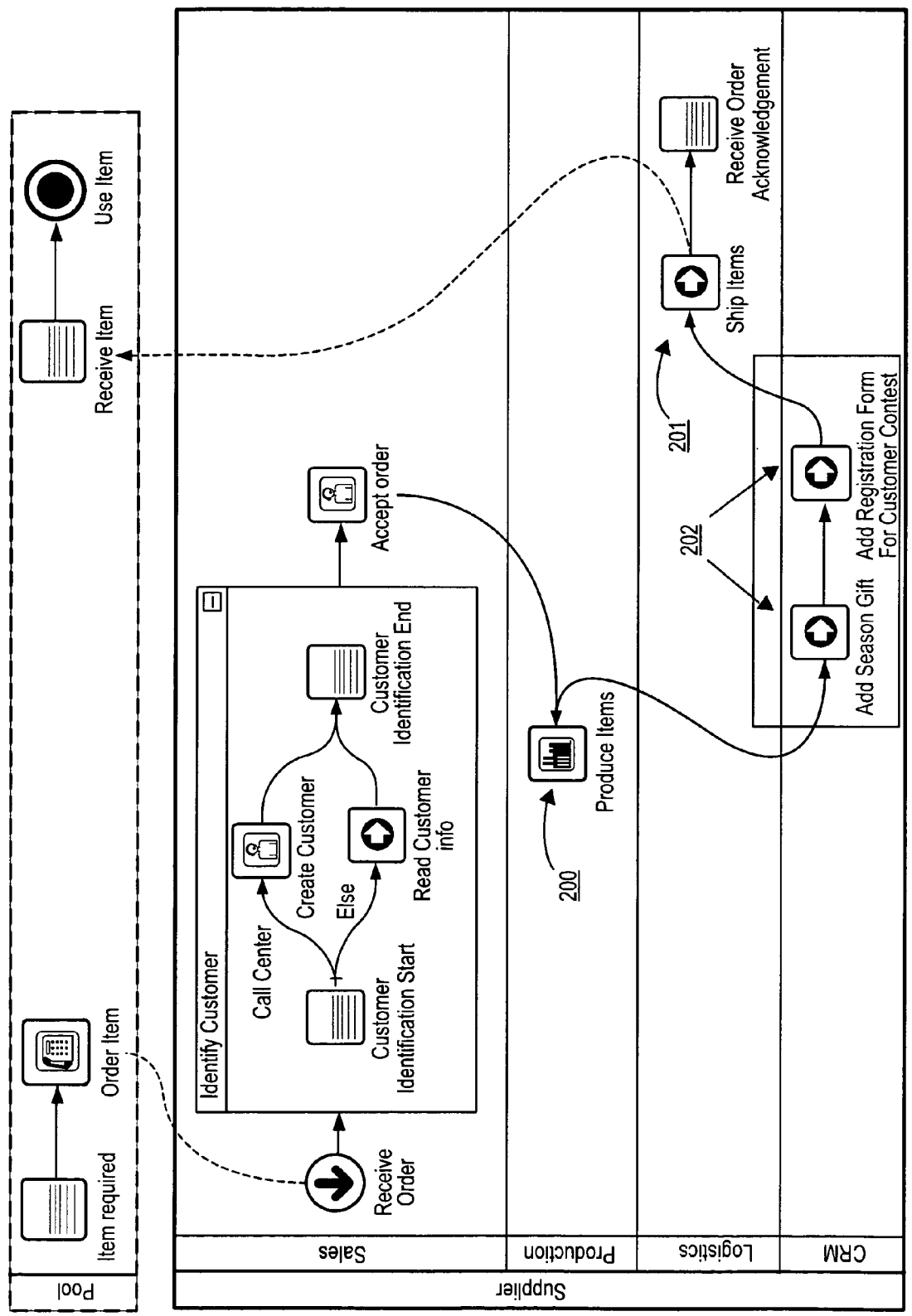
Figure 7:
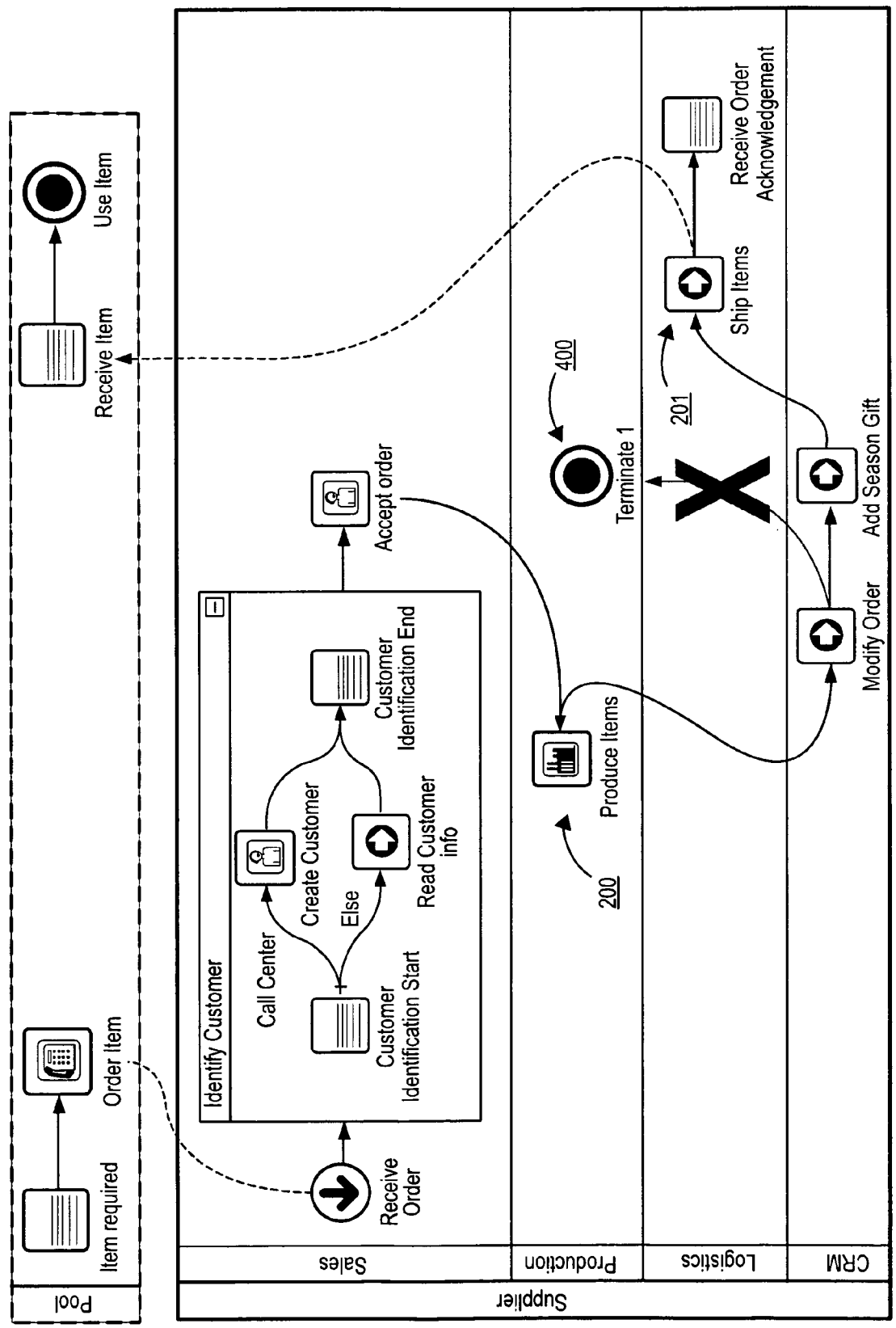
Figure 8:
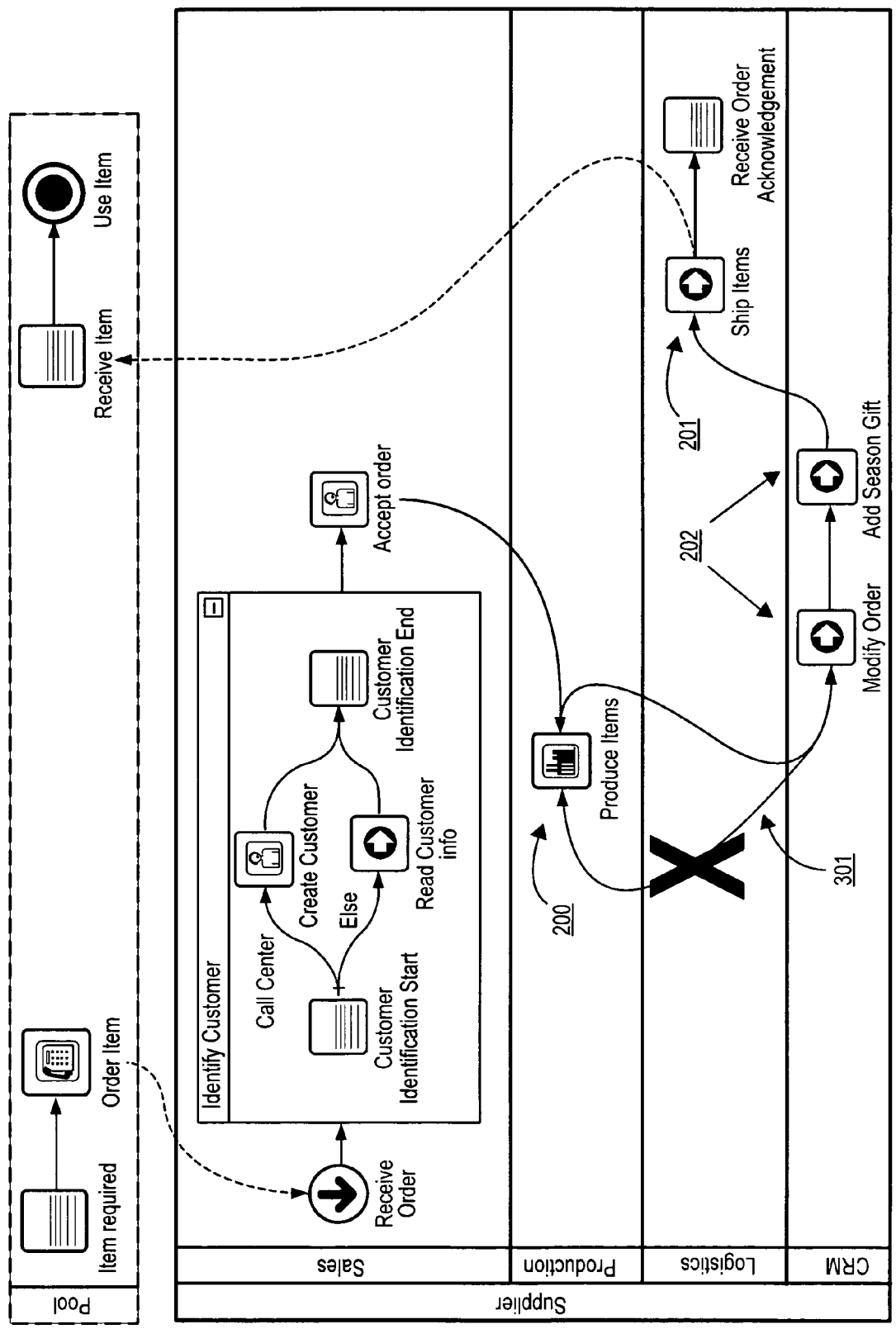
Figure 9:
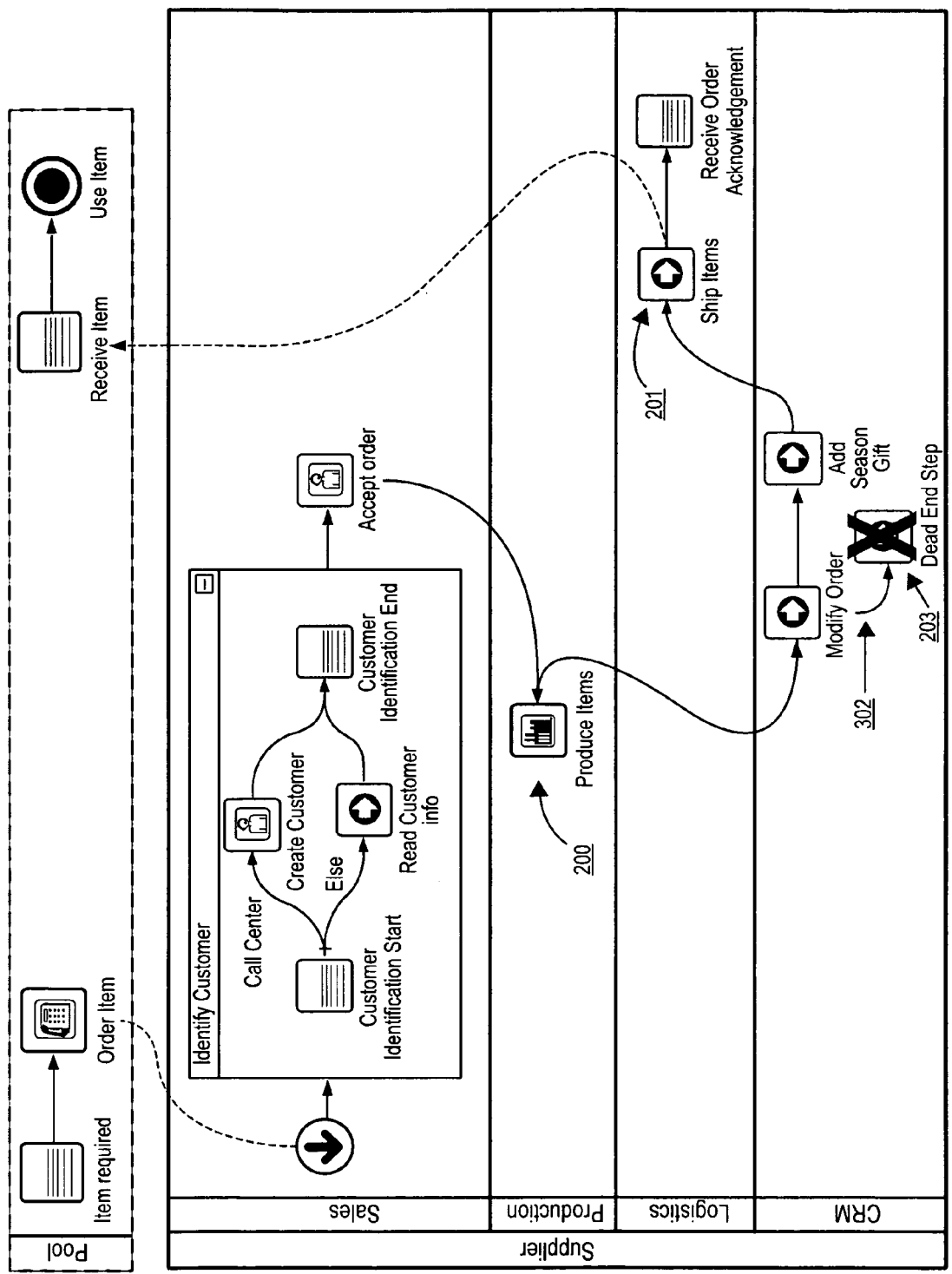
Figure 10:
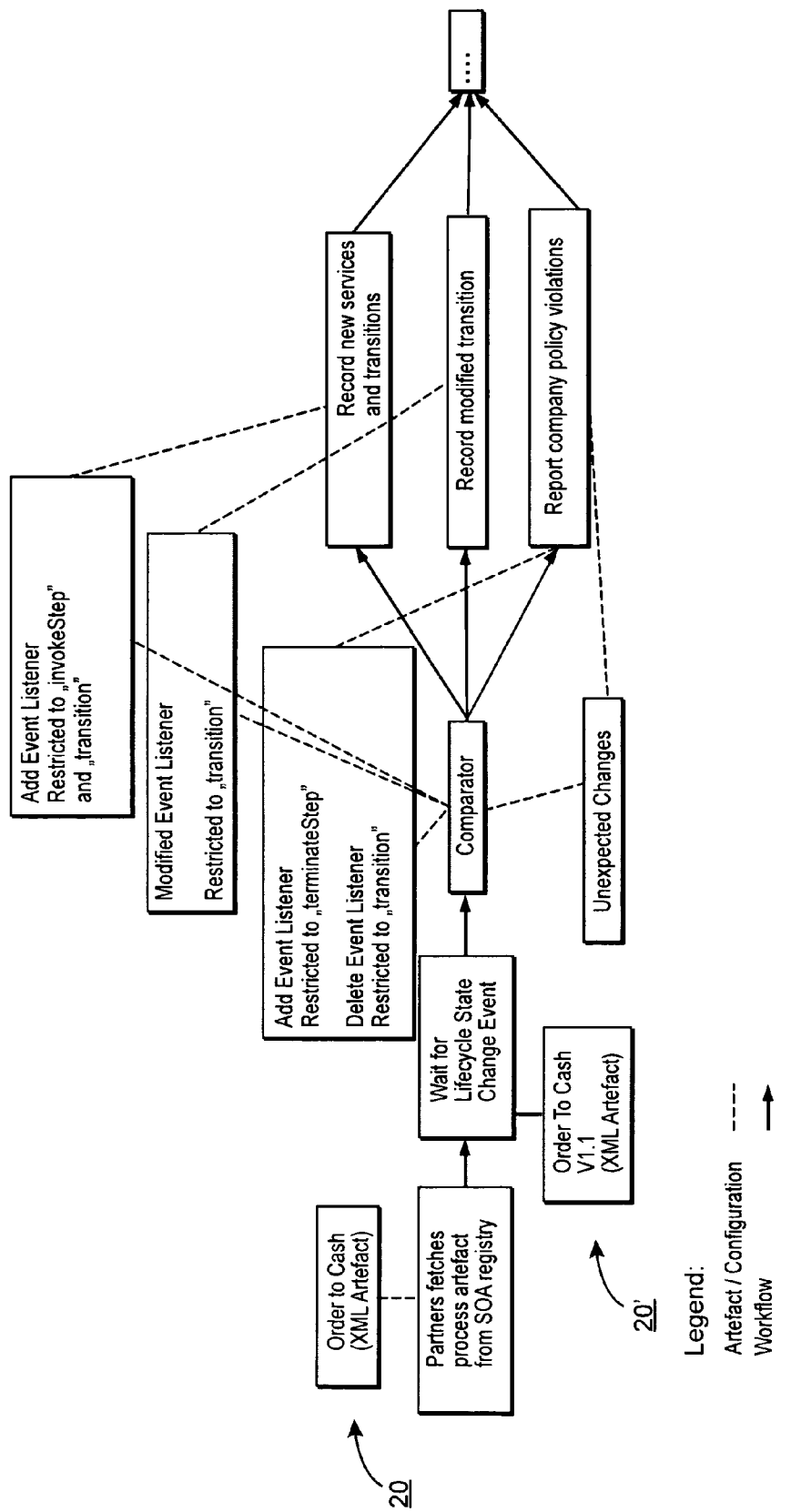
Figure 15:
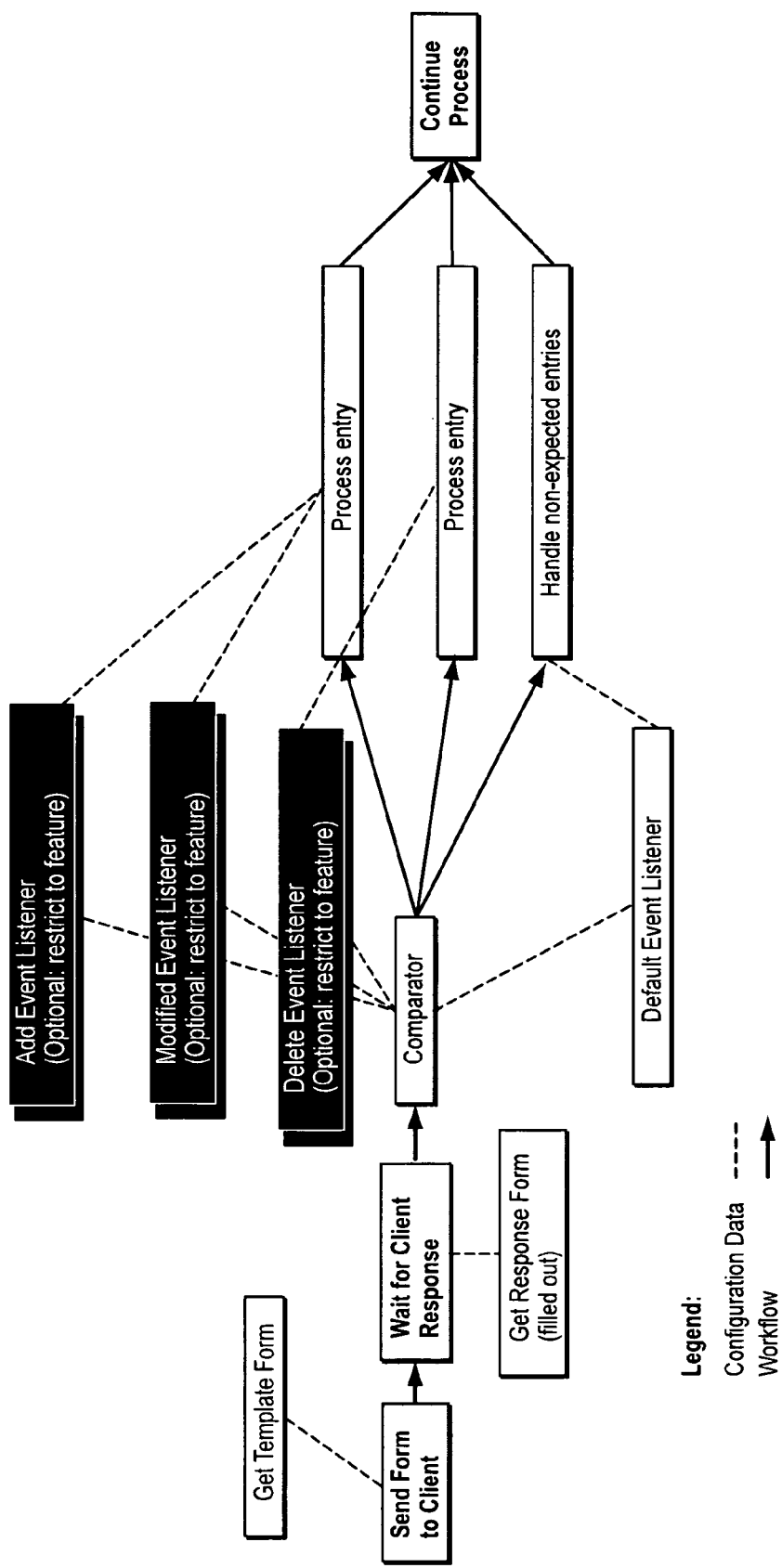
Figure 19:
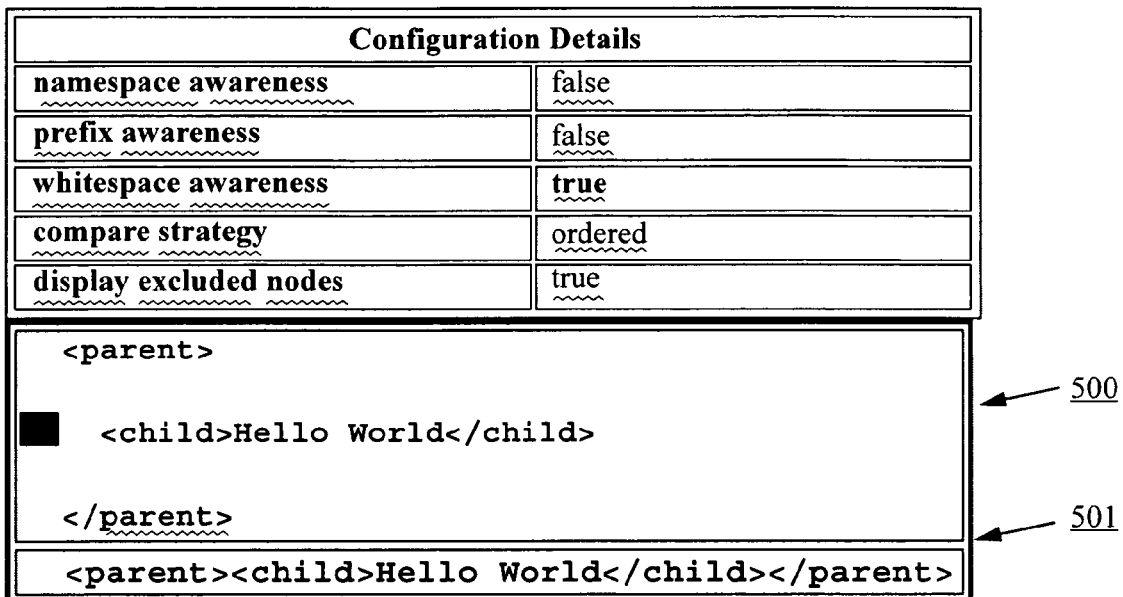
Figure 20:
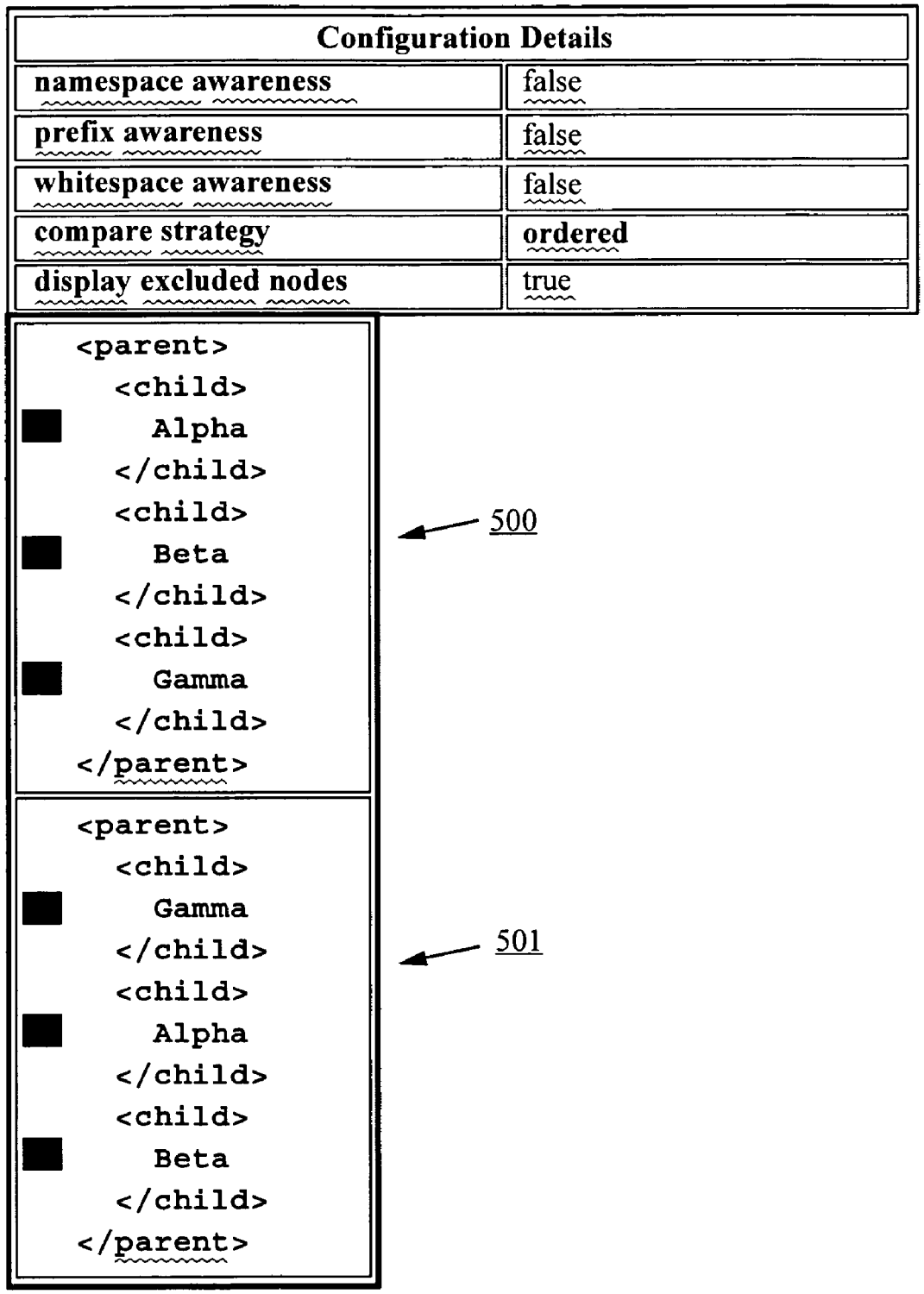
Figure 23:
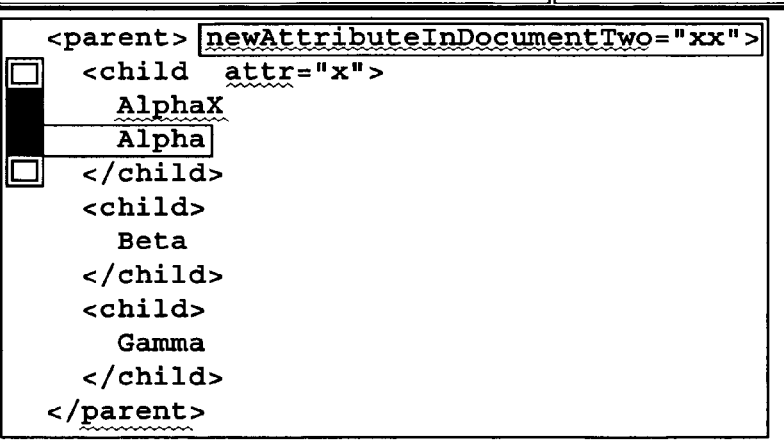

In the following detailed description, presently preferred embodiments of the invention are further described with reference to the following figures:

FIG. 1: A schematic view of an embodiment of a consistency enforcement system according to the present invention;

FIG. 2: A schematic view of an XML object and an updated XML object according to an embodiment of the present invention;

FIG. 3: An exemplary process according to an embodiment of the present invention;

FIG. 4: An exemplary updated process according to an embodiment of the present invention comprising an unallowed processing task;

FIG. 5a: An exemplary definition of predefined processing task identifiers according to an embodiment of the present invention;

FIG. 5b: An exemplary search template defining a query for an SOA-registry according to an embodiment of the present invention;

FIG. 5c: An exemplary result list received by an SOA-registry according to an embodiment of the present invention;

FIG. 6: An exemplary updated process according to an embodiment of the present invention comprising an allowed extension of the exemplary process of FIG. 4;

FIG. 7: An exemplary updated process according to an embodiment of the present invention comprising an unallowed additional termination step;

FIG. 8: An exemplary updated process according to an embodiment of the present invention comprising an unallowed back-loop;

FIG. 9: An exemplary updated process according to an embodiment of the present invention comprising an unallowed dead-end processing task;

FIG. 10: A schematic view of an exemplary implementation of an embodiment of the present invention;

FIG. 11: An exemplary implementation of a part of a consistency enforcement system according to an embodiment of the present invention;

FIG. 12: An exemplary implementation of a part of a consistency enforcement system according to an embodiment of the present invention;

FIG. 13: An exemplary output of a consistency enforcement system according to an embodiment of the present invention;

FIG. 14: An exemplary output of a consistency enforcement system according to an embodiment of the present invention;

FIG. 15: A schematic view of an exemplary implementation of a configurable XML comparator according to an embodiment of the present invention;

FIG. 16 A Java API for accessing the configurable XML comparator;

FIGS. 17a, b: Two exemplary XML documents compared with namespace awareness;

FIG. 18: Two exemplary XML documents compared with prefix awareness;

FIG. 19: Two exemplary XML documents compared with whitespace awareness;

FIG. 20: Two exemplary XML documents compared with a compare strategy "ordered";

FIG. 21: Two exemplary XML documents compared with a compare strategy "unordered";

FIG. 22: An exemplary HTML report of the configurable XML comparator;

FIG. 23: An exemplary compact HTML report of the configurable XML comparator;

FIG. 24: An overview of a difference reporting of the configurable XML comparator;

FIG. 25: A datatype definition for the configurable XML comparator; and

Figure 26:
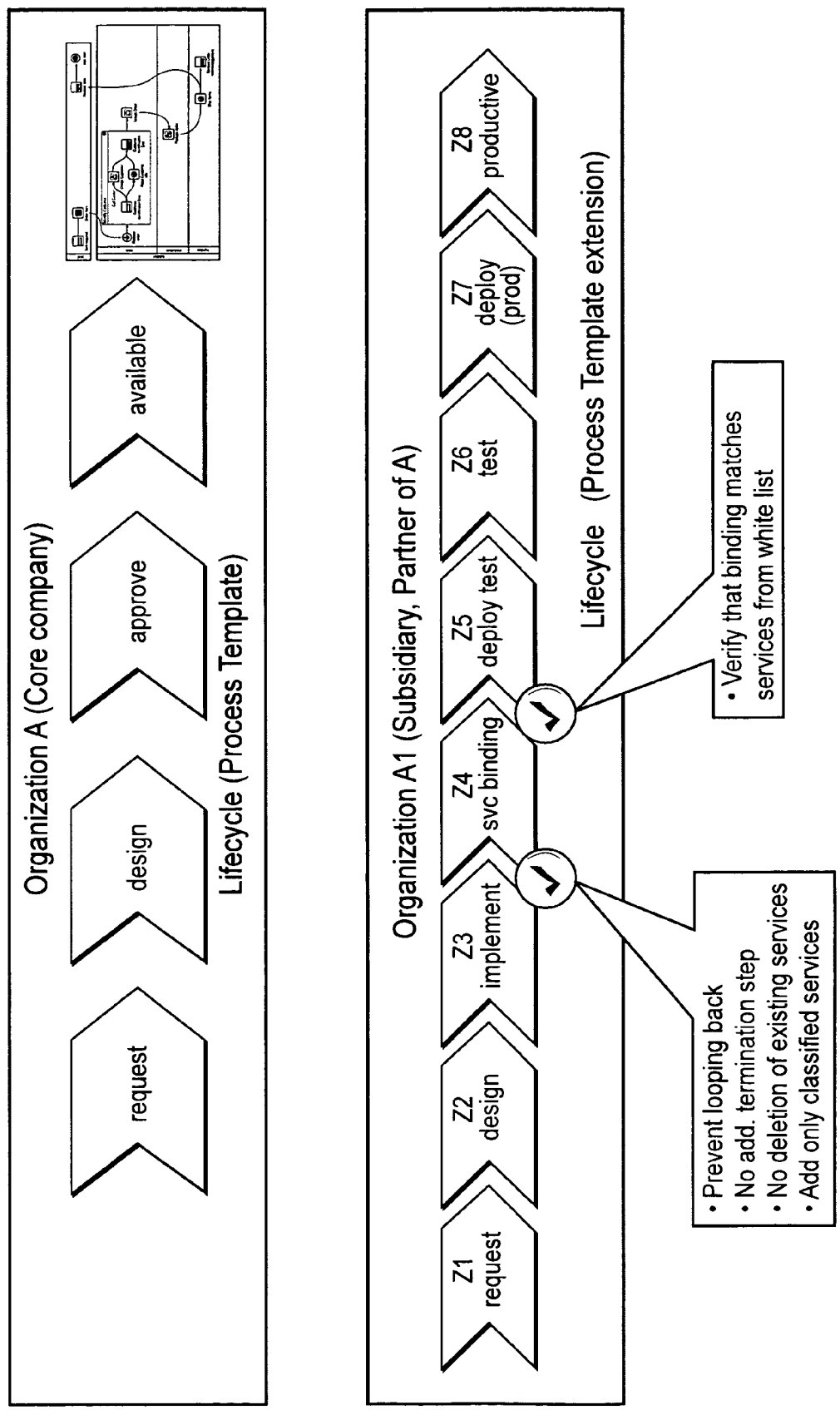

FIG. 26: A schematic view of an exemplary use of the present invention within the context of a business process.

DETAILED DESCRIPTION

In the following, a presently preferred embodiment of the invention is described with respect to a consistency enforcement system 1 as schematically shown in FIG. 1. As can be seen, the consistency enforcement system 1 comprises an interface 10 and a validation unit 11. The consistency enforcement system 1 is in communication with an SOA-registry 2 comprising an XML object 20. The XML object 20 comprises two processing task XML elements 200, 201. It should be appreciated that FIG. 1 only shows a simple example and that the SOA-registry 2 may comprise a plurality, possibly thousands, of arbitrarily complex XML objects 20 processable by the consistency enforcement system 1 of the present invention.

The consistency enforcement system 1 is capable of receiving the XML object 20 as well as an updated XML object 20' via the interface 10. In the example of FIG. 1, the updated XML object 20' comprises a further processing task XML element 202 that is not comprised in the XML object 20 stored within the SOA-registry 2.

More specifically, FIG. 2 shows that the exemplary XML object 20 comprises the two XML elements 'processingTask' 200 and 201. Each of the XML elements 'processingTask' 200, 201 comprises an XML attribute 'uid' (in the example of FIG. 2 with the values 'S200' and 'S201', respectively) that represents a processing task identifier for the respective processing task XML element 200, 201. It should be appreciated that a processing task XML element may alternatively comprise a label in a human-readable form (e.g. in an XML attribute 'label'), which may also serve as processing task identifier. The updated XML object 20' also shown in FIG. 2 comprises the same processing task XML elements than the XML object 20, and additionally comprises a further processing task XML element 202. It should be appreciated that FIG. 2 only shows a simple example for the sake of illustration and that much more complex XML objects 20 comprising more complex structural elements are supported by the present invention.

Returning to FIG. 1, the consistency enforcement system 1 further comprises a validation unit 11. The validation unit 11 is capable of querying, preferably via an XQuery, the SOA-registry 2 in order to retrieve a list of predefined processing task identifiers 25 (cf. FIG. 1, wherein the querying of the SOA-registry 2 by the validation unit 11 is indicated by the bottom double-headed dashed arrow). The validation unit 11 is capable of matching the processing task identifier of the additional processing task XML element 202 of the updated XML object 20' against the list of predefined processing task identifiers 25 in order to determine, whether the updated XML object 20' is allowable in view of the XML object 20, i.e. whether the additional processing task XML element 202 shown in FIGS. 1 and 2 is a valid extension of the XML object 20. To this end, the validation unit 11 determines if the processing task identifier of the additional processing task XML element 202 is comprised in the list of predefined processing task identifiers.

The validation unit 11 may evaluate the result of the matching in two ways. One way is regarding the list of processing task identifiers 25 as a "whitelist", i.e. the updated XML object 20' is only approved by the validation unit 11, if the processing task identifier is comprised in the list of processing task identifiers 25, otherwise the updated XML object 20' is rejected. Additionally or alternatively, the list of processing task identifiers 25 may be regarded as a "blacklist", i.e. the updated XML object 20' is only approved by the validation unit 11, if the processing task identifier is not comprised in the list of processing task identifiers 25, otherwise the updated XML object 20' is rejected.

Generally, the processing task XML elements comprised in the XML objects of the SOA-registry 2 may define a number of processing tasks to be performed by components of the SOA, e.g. individual computations to be performed by various computing systems of the SOA. To this end, the XML objects, such as the XML object 20 shown in FIG. 2, may comprise one or more transition XML elements 300 that define a sequence upon the processing task XML elements. As can be seen in FIG. 2, the exemplary XML object 20 comprises an XML element 'transition' 300 that comprises an XML attribute 'source' and an XML attribute 'target'. The value of the XML attribute 'source' is 'S200' and thus references the processing task XML element 200 (with the uid S200). Similarly the value of the XML attribute 'target' of the transition XML element 300 is 'S201', thus referencing the processing task XML element 201 in this example. It should be appreciated that the XML structure shown in FIG. 2 is only one of a wide variety of possibilities and that differently structured XML content with differently labeled XML elements, XML attributes, etc. is also supported by the present invention, e.g. defining the 'source' and 'target' references not as XML attributes, but rather as XML elements themselves, or in any other suitable manner.

In summary, an XML object 20 defines a sequence, preferably a directed graph, of processing tasks (also called 'services' in the following) to be performed by components of the SOA, comprehensively called a process in the following. FIG. 3 schematically shows an exemplary process 'order to cash'. The process 'order to cash' defines how an item (i.e. a product such as a car) is ordered by a customer (cf. the processing task 'Order Item' in FIG. 3). After the order is received and accepted (cf. the processing tasks 'Receive Order', 'Identify Customer' and 'Accept Order' in FIG. 3, wherein 'Identify Customer' defines a composite processing task that itself comprises the further processing tasks 'Customer Identification Start', 'Create Customer', 'Read Customer Info' and 'Customer Identification End'), the corresponding ordered item is produced by the processing task 'Produce Items'. Subsequently, the produced item is shipped (cf. the processing task 'Ship Items') and the logistics department receives an order acknowledgement (cf. the processing task 'Receive Order Acknowledgement' in FIG. 3). Lastly, the customer receives the ordered item (cf. the processing task 'Receive Item'), uses the item and the process ends. On a technical level, each of the above-described processing tasks (i.e. services) is defined by a corresponding processing task XML element within the XML object 20 stored in the SOA-registry 2. A processing task XML element may further comprise definitions for executing a computer program such as a local and/or remote service or web service implementing the necessary processing logic.

In the context of the exemplary process of FIG. 3, a company 'A' might instruct their IT department to create the process 'order to cash' as a base process that serves as a process template. This template is compliant to the company rules (policies) and may be provided to the partners participating in the execution of the process, e.g. the suppliers of company 'A'. The partners might use the process template as is and/or extend it in a "compliant" way, i.e. in such a manner that no unallowed extensions are performed (with respect to the rules of company 'A'). Therefore, a governance process has to be installed ensuring that all extended process definitions are valid.

As already mentioned further above, the challenge is to provide a balance between flexibility (the ability to modify the base process) and control (ensuring that modified processes are still compliant). The present invention provides an advantageous solution to this challenge. To this end, the XML object 20 stored in the SOA-registry 2 is in the SOA terminology understood as an asset described by XML artifacts and the present invention facilitates maintaining lifecycle state transitions (i.e. changes over time) of such assets. The consistency enforcement system 1 of the present invention receives two XML artifacts as input, artifact 1 representing the XML object 20 before a lifecycle state transition (i.e. before an extension) and artifact 2 representing the current state of the XML object 20 (i.e. the updated XML object 20') including the extension(s). The consistency enforcement system 1 of the present invention then analyses whether the identified changes between the object versions 20 and 20' are valid according to the position of change ("Where") and/or the type of change ("What"). Depending on the result, the changes are accepted (approved) or rejected. In the following, various analyses and validations that may be performed by the consistency enforcement system 1 of the present invention are presented in more detail. It should be appreciated that these aspects may be implemented independently from each other and that further analyses and validation may be implemented within the present invention as needed.

The first step may be to analyze the XML format of the process (i.e. the XML object 20) and derive the constraints for the consistency enforcement system 1.

One constraint may be that the process designer of the partner is allowed to add new services (i.e. processing tasks represented by processing task XML elements). Furthermore, the partner may be allowed to add only services and no termination steps. Moreover, the partner may not be allowed to delete any existing service from the process defined in the XML object 20.

FIG. 11 shows a part of an exemplary Java implementation of the consistency enforcement system 1. On the XML level, services (i.e. processing task XML elements) are represented in FIG. 11 by an XML element 'invokeStep'. The Java code in FIG. 11 shows how the validation unit 11 (called 'bpmdc' in the code) can validate the above-presented constraints. In one possible implementation, the consistency enforcement system 1 may comprise an XML comparator unit and the validator may be fed by events from the XML comparator.

A further constraint may be that services (i.e. processing tasks represented by processing task XML elements) are only allowed to be inserted between two distinct services, e.g. the services 'Produce Items' 200 and 'Ship Items' 201 shown in FIG. 3. The exemplary Java code in FIG. 12 shows how the validation unit 11 (called 'bpmdc' in the code) can validate this constraint, possibly fed by events from the XML comparator.

Examples of valid changes to the XML object 20 (within the updated XML object 20') comprise:
New services are inserted, i.e. new processing task XML elements ('invoke-Step' in FIGS. 11 and 12) are added.
Exactly one transition has been modified pointing to a new service, i.e. the updated XML object 20' comprises a modified transition XML element with a changed XML attribute 'source' and/or 'target'.
New transitions are inserted, i.e. the updated XML object 20' comprises new transition XML elements ('transition' in FIG. 12).
Every path (i.e. sequence of processing steps) starting from the modified transition leads to a particular predefined service, e.g. the service 'Ship Items'.

FIG. 6 shows a valid extension of the process template (defined by the XML object 20), i.e. FIG. 6 shows a visualization of the updated XML object 20'. As can be seen, the updated XML object 20' comprises two additional processing task XML elements 202 (represented by the additional services 'Add Season Gift' and 'Add Registration Form for Customer Contest'), which were inserted between the predefined "boundary" services 'Produce Items' 200 and 'Ship Items' 201. FIG. 13 shows an exemplary output log produced by the consistency enforcement system 1.

Examples of invalid changes to the XML object 20 (within the updated XML object 20') comprise:
Other elements than a service and/or a transition were added.
More than one transition has been modified. This means that the partner is trying to modify other areas of the process than in between 'Produce Items' and 'Ship Items'
Any path starting from the modified transition does not lead to the service 'Ship Items', which means that the updated XML object 20' defines an invalid endpoint.
Any path starting from the modified transition leads to a service other than anyone of the newly inserted services or 'Ship Items', which means that the updated XML object 20' comprises an invalid looping to previous process steps.

FIG. 7 shows an example of an invalid extension of the process due to an additional termination step 400. As can be seen, the updated process (as defined in the updated XML object 20') comprises an additional termination step (defined by the termination step XML element 400) with respect to the template process (as defined in the XML object 20).

FIG. 8 shows an example of an invalid extension of the process due to an invalid looping. As can be seen, the updated process (as defined in the updated XML object 20') comprises a transition 301 (defined by the transition XML element 301) originating from the service 'Modify Order' 202 back to the service 'Produce Items' 200 with respect to the template process (as defined in the XML object 20). FIG. 14 shows an exemplary output log produced by the consistency enforcement system 1.

FIG. 9 shows an example of an invalid extension of the process due to a dead end. As can be seen, the updated process (as defined in the updated XML object 20') comprises an additional service 203 'Dead End Stop' and a transition 302 with the source service 'Modify Order' and the target service 203 'Dead End Stop'. However, there is no further transition defining a path (i.e. sequence of processing tasks/services) that would lead to the endpoint 'Use Item' of the process with respect to the template process (as defined in the XML object 20).

The above examples show how the present invention may validate rules how to locate changes to the XML object 20 (as defined in the updated XML object 20') and/or whether the located changes are valid regarding to the location of their appearance. In the following, it is described how the present invention may validate whether new services (i.e. processing tasks defined by processing task XML elements in the updated XML object 20') are valid according to their type.

Typically, services can be classified within a registry such as the SOA-registry 2 with the help of taxonomies. FIG. 5a shows an exemplary taxonomy comprising predefined processing task identifiers 25. The exemplary taxonomy to this end comprises a hierarchical list of service names/labels. As already mentioned further above, the list may alternatively comprise predefined processing task identifiers 25 in the form of unique identifiers, e.g. correlating to the XML attributes 'uid' of the processing task XML elements.

Following the concept of a whitelist, the validation unit 11 of the present invention may check whether the new service(s) defined in the updated XML object 20' is/are listed in the SOA-registry 2 as valid extension services. The validation unit 11 may therefore execute an XQuery to the SOA-registry 2 and check whether the new service is comprised in the query response list. If yes, then it matches the extension criteria and the updated XML object 20' is approved, otherwise it does not and the updated XML object 20' is rejected.

FIG. 5b shows an exemplary search template defining a query for listing seasonal gift services with a value range up to 5 Euros per order. The result of this query is the list of services that are allowed to be inserted. As shown in FIG. 5c, the result list comprises only a single service (i.e. a processing task identifier 25) called 'AddFlowerToOrderService'. In the example of FIG. 5b, a saved query is used that triggers a call of an API (application programming interface) provided by the SOA-registry 2, such as 'List<Service>getWhiteList (String savedQueryName)'.

FIG. 4 shows in this context an example for an invalid change to the process (as defined in the XML object 20). As can be seen, the updated process (as defined in the updated XML object 20') comprises an additional service 'Format Harddisk' (defined by a corresponding processing task XML element 202 in the updated XML object 20'). However, this additional service is not allowed, since its processing task identifier is not comprised in the list of predefined processing task identifiers 25. Instead, according to the exemplary list of predefined processing task identifiers 25 shown in FIG. 5c, the process may only be extended with the service 'AddFlowerToOrderService'.

In summary, the present invention is especially advantageous with respect to the following aspects: rules can be adapted very fast, for example but not limited to the help of an XML comparator and/or the information from a registry. The present invention may provide an 80% solution already in form of a template and it is only required to define rules for the template evolution (i.e. changes to the template). Lastly, the present invention facilitates an especially reliable control of changes to a process, since by default everything is under control and no change is ignored unless explicitly ignored.

Therefore, the present invention provides a solution for constraining the evolution (i.e. changes) of an asset (i.e. an XML object) during lifecycle state transitions (i.e. over time) and therefore can be easily embedded into SOA governance processes. By analyzing the evolution of an asset, the present invention allows a policy designer to define a set of rules to be triggered upon changes during lifecycle transitions. An asset, i.e. an XML object may describe all kinds of objects in the registry that have a direct or indirect relationship to services. According to OASIS, a service in conjunction with a Service Oriented Architecture (SOA) is a "contracted interface to software functionality". In this context, services are usually remotely accessible and can be consumed by a process. Typical questions addressed by the present invention are: Is the modification of an asset allowed at this lifecycle stage? Which parts of the asset are affected by the modification? Does the altered (meta) data change the behaviour of this asset significantly? The present invention addresses these questions by defining where changes are allowed, by defining what type of changes are allowed and by enforcing compliance in conjunction with lifecycle state transitions.

The present invention may be advantageously used for, but is not limited to, the enforcement of the consistency of at least one XML object stored in a SOA registry that represents a business process or workflow. The XML object representing a business process or workflow may comprise a collection of related, structured activities represented by the XML element and/or XML attributes of the XML object (such as the processing task XML elements described further above). Typically, activities of a business process represent a mixture of service calls (in this context, the business process can also be understood as a service orchestration) and/or one or more tasks performed by human personnel (in order to make certain decisions or exception handling).

The following is an example of the use of the present invention in the context of an exemplary business process as shown in FIG. 26. In the example, an organization 'A' (cf. FIG. 26) has one or more franchising partners 'A1', 'A2' (in FIG. 26, only organization 'A1' is shown). 'A' defines the core business processes and wants to allow only slight modifications. Therefore, using the present invention, 'A' provides 'A1', 'A2' with the core processes as well as with a lifecycle definition and policies that are attached to the lifecycle transitions. Policies serve in this context for checking the consistency of the registry objects representing the business processes (cf. the XML object 20 and/or the updated XML object 20') and their activities (cf. the processing task XML elements 200, 201, 202).

With reference to FIG. 26, an exemplary lifecycle for 'A1', 'A2' looks as follows (Zn represents a state, → represents a transition):

Z1: request template P1
Z2: design phase of P1.1 (extension/modification of P1, e.g. generate conceptual document, Word, use case, etc.)
Z3: implementation phase of P1.1 (i.e. model new activities in the BPM process)
Z4: bind P1.1 to concrete services, i.e. service endpoints (BPM activities with service objects in the SOA-registry)
Z5: deployment P1.1 (in a testing environment)
Z6: testing phase
Z7: deployment of P1.1 (in a production environment)
Z8: in production A lifecycle without backloops (e.g. corrections) may then look like Z1→Z2→Z3→Z4→Z5→Z6→Z7→Z8, as depicted in FIG. 26. Using the present invention, it is ensured that e.g. within Z3, the XML object can be modified (and stored) arbitrarily. During the transition between Z3 and Z4 however, one or more consistency rules, preferably implemented as policy actions, may be applied to match the physical XML objects P1 (corresponding to the original XML object 20) and P1.1 (corresponding to the updated XML object 20'). In case of a validation to the negative (i.e. the updated XML object representing P1.1 is rejected), the transition to Z4 is prevented (and therefore also not to Z5 and the subsequent states). It should be appreciated that, as already mentioned above, the updated XML object may nevertheless be stored in the SOA-registry, even if it comprises invalid extensions. However, when attempting to move to the next state within the lifecycle model (Z4 in the example of FIG. 26), a policy may be triggered that validates the target state compliancy of the selected object and in case of policy violations, the transition from the current state to the target state is prohibited.

In case of a positive validation, the transition to state Z4 is performed. In Z4 (connection of P1.1 with services; cf. FIG. 26), the service bindings are created. During the transition between Z4 and Z5, the blacklist/whitelist validation may be performed. In case illegal services are encountered during the validation, no deployment is performed (i.e. no transition to Z5). As already presented further above, the blacklist/whitelist validation may comprise performing the matching not only against the updated XML object, but additionally against further configuration files references in the updated XML object, since not all information may be stored within the updated XML object itself. For example, the XML object may comprise information about the interface of the respective service (e.g. its input/output interface definition), but may not comprise information about which concrete service implements the interface definition, i.e. where the service is located (server URL, port, etc.). This information may instead be e.g. comprised in binding and/or deployment configuration files (which may be located in the SOA-registry).

FIG. 10 shows an exemplary and non-limiting implementation of the present invention in more detail. As can be seen, the consistency enforcement system 1 may comprise a configurable XML comparator to identify the differences between two versions of an XML artefact, i.e. between an XML object 20 and an updated XML object 20'. A special policy action invokes this comparator and passes the XML object 20 and the updated XML object 20'. An event handler attached to this comparator analyses whether the identified changes are valid according to the above-described aspects of the present invention. To this end, the SOA-registry 2 storing the assets 20 may maintain the lifecycle state transitions for the assets 20. Lifecycle events bound to a state transition may trigger policies. Each policy may comprise a set of actions in order to validate and enforce compliance with company standards. The correctness of the location of a change can be immediately derived from the configuration of the XML comparator, whereas validating the type of changes requires querying the SOA-registry 2, as already described above.

The XML comparator shown in FIG. 15 allows to compare XML documents and trees including advanced namespace handling, namespace awareness (i.e. elements and/or attributes residing in the same namespace), prefix awareness (i.e. elements and/or attributes that have the same namespace and prefix) and/or whitespace awareness. Furthermore, sub trees within XML documents can be selected or dropped using XPATH statements. The XML comparator further supports the integration of different or customized comparators for node types. The XML comparator may support three report modes: HTML output with highlighting and using customized templates, XML output, wherein differences are reported as XPATH statements and/or Boolean output, which determines whether XML documents are identical (true) or not (false). XML Documents can be available in the form of URLs, files and/or streams. One exemplary implementation of the XML comparator requires JRE 1.4.x and Xalan 2.4+ and can be accesses via command line, e.g. as follows: xdt2 −1 file:test1.xml −2 file:test2.xml −xml report.xml −xmlns or xdt2 −1 file:a.xml −2 http://a.b.c/b.xml −x "//comment( )" −xml report.xml.

FIG. 16 shows a Java API (application programming interface) for accessing the XML comparator.

In the following, the various capabilities of the XML comparator are described in more detail with accompanying examples:

namespace awareness: FIG. 17a shows two exemplary XML documents 500, 501 which are considered equal, although they have a different prefix ('a' and 'b', respectively). FIG. 17b shows two exemplary XML documents 500, 501 which are considered equal, although a different prefix and namespace ('http://A' and 'http://B', respectively) is used.

prefix awareness: FIG. 18 shows two exemplary XML documents 500, 501 which are considered not equal, since prefix awareness is activated.

whitespace awareness: FIG. 19 shows two exemplary XML documents 500, 501 which are considered not equal, since the document 500 has whitespace text nodes between parent and child elements and the document 501 does not.

compare strategy "ordered": FIG. 20 shows two exemplary XML documents 500, 501 which are considered not equal, since the text nodes are modified if compared node by node in the original order.

compare strategy "unordered": FIG. 21 shows two exemplary XML documents 500, 501 which are considered equal, because the order of the nodes is ignored.

normal HTML reporting: If normal HTML reporting is enabled, both documents 500, 501 are printed in a normalized style: XML elements that do not have child elements are printed as follows: <element attr1=". . . " attr2=". . . "/>. For each child node of an XML element, a new line and indention is printed. This is also the case if the element only contains one text node. The differences are higlighted with colors and printed from the point of view of document 500, i.e.: added nodes are nodes being added within document 500 and marked green. Modified nodes are nodes being available and different in both documents 500, 501 and marked blue. Deleted nodes are nodes being either removed from document 500 or newly added in document 501 and marked red. Excluded nodes are marked in grey and with italic font-style. Excluded nodes can be visualized in the HTML report using either the command line option "-showExcluded" or the corresponding JAVA API method #setShowExcluded(true) (class DOMComparator). An exemplary normal HTML report is depicted in FIG. 22.

compact HTML reporting: If compact HTML reporting is enabled, only document 500 is printed in a normalized style and the differences from document 501 are inserted and marked inverted: XML elements that do not have child elements are printed as follows: <element attr1=". . . " attr2=". . . "/>. For each child node of an XML element, a new line and indention is printed. This is also the case if the element only contains one text node. The differences are higlighted with colors and printed from the point of view of document 500, i.e.: Added nodes are nodes being added within document 500 and marked green. Modified nodes are nodes being available and different in both documents 500, 501 and marked blue. The modified nodes from document 501 are marked inverted blue and added next or beneath to the modified nodes of document 500. Deleted nodes are nodes being either removed from document 500 or newly added in document 501 and marked inverted red. Excluded nodes are marked in grey and with italic font-style. Note: All inverted marked nodes and attributes are not part of document 500, they are part of document 501. Excluded nodes can be visualized in the compact HTML report using either the command line option "-showExcluded" or the corresponding JAVA API method #setShowExcluded(true) (class DOM-Comparator). An exemplary compact HTML report is depicted in FIG. 23.

custom HTML reporting: Additionally or alternatively, the visualization of the output of a comparison operation can be influenced by writing a custom XSL-stylesheet.

FIG. 24 shows an overview how the difference reporting is implemented in XML using XPATH. FIG. 25 shows a DTD (Document Type Definition) for the difference reporting.

The invention claimed is:

1. A consistency enforcement system for at least one extensible markup language (XML) object that is stored in a service oriented architecture (SOA) registry, the at least one XML object including a plurality of processing task XML elements that each respectively define at least one processing task that is to be performed by at least one component of the SOA, the consistency enforcement system comprising:

an interface configured to receive an updated XML object comprising at least one additional processing task XML element that defines at least one further processing task to be performed by components of the SOA, wherein the at least additional processing task XML element is not included in the at least one XML object that is stored in the SOA registry; and a validation unit configured to communicate with the SOA registry in order to obtain one or more predefined processing task identifiers, each one of the predefined processing task identifiers corresponding to a predetermined processing task, wherein the validation unit is further configured to determine a result based at least in part on comparing a processing task identifier of the at least one additional processing task XML element of the updated XML object against the one or more predefined processing task identifiers obtained from the SOA registry, the validation unit being further configured to either approve or reject the updated XML object based on the result, and wherein the validation unit is further configured to either (a) store the updated XML object in the SOA registry, or (b) replace the at least one XML object stored in the SOA registry, or (c) store the updated XML object in the SOA registry and replace the at least one XML object stored in the SOA registry, only when the result is an approval of the updated XML object.

2. The consistency enforcement system of claim 1, wherein the validation unit is configured to reject the updated XML object when the result of the comparison of the processing task identifier of the at least one additional processing task XML element to at least one of the predefined processing task identifiers obtained from the SOA registry is not a match.

3. The consistency enforcement system of claim 1, wherein the validation unit is configured to reject the updated XML object when the result of the comparison of the processing task identifier of the at least one additional processing task XML element to at least one of the predefined processing task identifiers obtained from the SOA registry is a match.

4. The consistency enforcement system of claim 1, wherein the validation unit is configured to reject the updated XML object when the updated XML object comprises at least one termination step XML element not included in the at least one XML object stored in the SOA registry, the at least one termination step XML element defining an end point of a sequence of processing tasks performed by components of the SOA.

5. The consistency enforcement system of claim 1, wherein the validation unit is configured to reject the updated XML object when the updated XML object includes at least one XML element type other than a processing task XML element type.

6. The consistency enforcement system of claim 1, wherein the validation unit is configured to reject the updated XML object when the XML object stored in the SOA registry comprises at least one processing task XML element that is not included the at least one updated XML object.

7. The consistency enforcement system of claim 1, wherein the at least one XML object stored in the SOA registry comprises at least one transition XML element, the at least one transition XML element referencing at least one source processing task XML element and at least one target processing task XML element in order to define a sequence between the corresponding processing task XML elements.

8. The consistency enforcement system of claim 7, wherein the validation unit is configured to reject the updated XML object when the at least one additional processing task XML element of the at least one updated XML object is not located within the sequence defined by the at least one transition XML element.

9. The consistency enforcement system of claim 7, wherein the validation unit is configured to reject the updated XML object when the updated XML object comprises at least one additional transition XML element defining a sequence of processing tasks that does not lead to a termination step XML element defined in the XML object stored in the SOA registry.

10. The consistency enforcement system of claim 7, wherein the validation unit is configured to reject the updated XML object when the updated XML object comprises at least one additional transition XML element defining a sequence of processing tasks that does not lead to the at least one additional processing task XML element.

11. The consistency enforcement system of claim 1, wherein the determined result of the validation unit is additionally based on validating at least one configuration property that the updated XML object depends upon.

12. The consistency enforcement system of claim 1, wherein the one or more predefined processing task identifiers are included in a pre-existing taxomony that is defined in the SOA registry.

13. A method for enforcing the consistency of at least one extensible markup language (XML) object stored in a service oriented architecture (SOA) registry, the at least one XML object including a plurality of processing task XML elements that each respectively define at least one processing task that is to be performed by at least one component of the SOA, the method comprising:
receiving an updated XML object comprising at least one additional processing task XML element that defines at least one further processing task to be performed by components of the SOA, wherein the at least additional processing task XML element is not included in the at least one XML object that is stored in the SOA registry;
communicating with the SOA registry in order to obtain one or more predefined processing task identifiers, each one of the predefined processing task identifiers corresponding to a predetermined processing task;
determining a result based at least in part on comparing a processing task identifier of the at least one additional processing task XML element of the updated XML object against the one or more predefined processing task identifiers obtained from the SOA registry;
approving or rejecting the updated XML object based on the result; and
when the result is an approval of the updated XML object, either (a) storing the updated XML object in the SOA registry, or (b) replacing the at least one XML object stored in the SOA registry, or (c) storing the updated XML object in the SOA registry and replacing the at least one XML object stored in the SOA registry.

14. A non-transitory computer readable storage medium storing computer readable instructions for enforcing the consistency of at least one extensible markup language (XML) object stored in a service oriented architecture (SOA) registry, the instructions causing at least one computer to at least:
receive an updated XML object that includes at least one additional processing task XML element that defines at least one further processing task to be performed by components of the SOA, the at least additional processing task XML element not included in the at least one XML object that is stored in the SOA registry;
retrieve one or more predefined processing task identifiers from the SOA registry, each one of the predefined processing task identifiers corresponding to a predetermined processing task;
determine a result based at least in part on comparing a processing task identifier of the at least one additional processing task XML element of the updated XML object against the one or more predefined processing task identifiers obtained from the SOA registry;
approve or reject the updated XML object based on the result; and
either (a) store the updated XML object in the SOA registry, or (b) replace the at least one XML object stored in the SOA registry, or (c) store the updated XML object in the SOA registry and replace the at least one XML object stored in the SOA registry, when the result is an approval of the updated XML object.

15. The medium of claim 14, wherein the one or more predefined processing task identifiers are included in a pre-existing taxomony that is defined in the SOA registry.

* * * * *